United States Patent [19]

Moon

[11] Patent Number: 5,421,116
[45] Date of Patent: Jun. 6, 1995

[54] PUMP ACTION CASTER FOR FISHING RODS

[76] Inventor: Andy Moon, 3557 W. Third St., Los Angeles, Calif. 90020

[21] Appl. No.: 950,732

[22] Filed: Sep. 24, 1992

Related U.S. Application Data

[63] Continuation-in-part of Ser. No. 811,011, Dec. 20, 1991, abandoned.

[51] Int. Cl.6 ............................................. A01K 91/02
[52] U.S. Cl. ..................................................... 43/19
[58] Field of Search ............................... 43/19; 89/1.34

[56] References Cited

U.S. PATENT DOCUMENTS

| | | | |
|---|---|---|---|
| 1,276,989 | 8/1918 | Svenson | 124/69 |
| 2,090,731 | 8/1937 | Klein | 124/69 |
| 2,958,975 | 8/1958 | Neff | 43/19 |
| 3,000,129 | 6/1958 | Rainey | 43/19 |
| 3,015,182 | 1/1962 | Tuttle et al. | 43/19 |
| 3,026,644 | 7/1960 | Raider | 43/19 |
| 3,266,184 | 11/1964 | Brown | 43/19 |
| 3,392,473 | 7/1968 | Dietsch | 43/19 |
| 3,419,991 | 1/1969 | Mitchell | 43/19 |
| 4,501,085 | 2/1985 | Barnes | 43/19 |
| 4,682,437 | 7/1987 | Akerberg | 43/19 |

*Primary Examiner*—Paula A. Bradley
*Assistant Examiner*—Jeanne M. Elpel
*Attorney, Agent, or Firm*—Trojan Law Offices

[57] ABSTRACT

A gas powered fishing pole having a conventional reel and rod and a gas powered projection device having a firing chamber with an external end from which a projectile with a hook or lure attached is fired. The improvement comprising a gas projection device that is no more than one half the length of the fishing rod, yet in which the gas charge is generated by manual operation of a lever actuated piston mechanism and wherein the projection device is secured to a fishing rod by a plurality of attachment means, but in which no more than one such means is attached in proximity to the external end of the firing chamber.

7 Claims, 3 Drawing Sheets

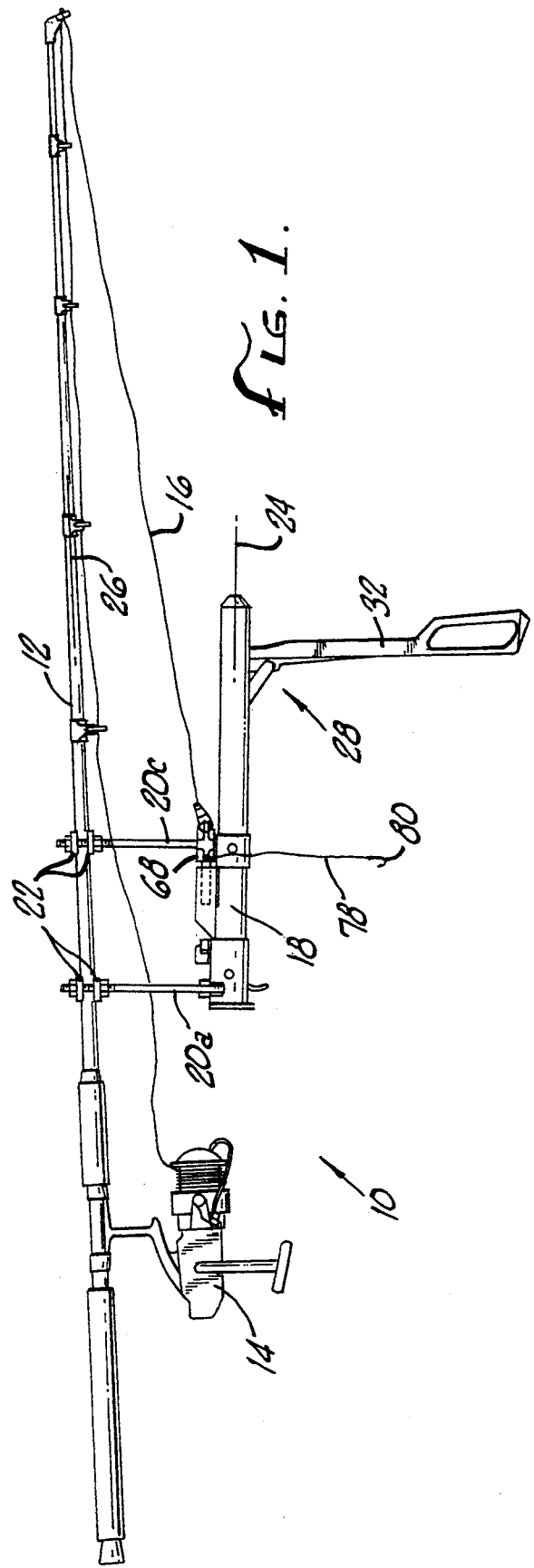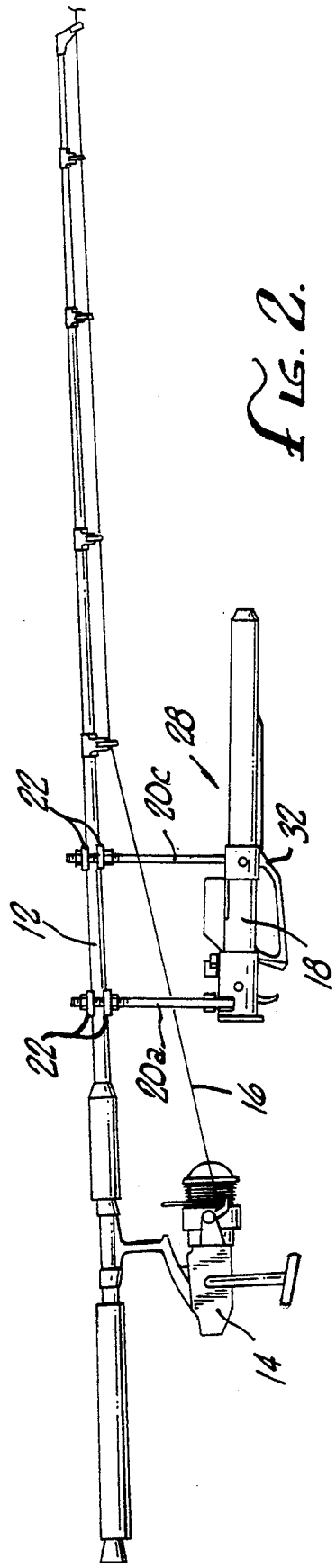

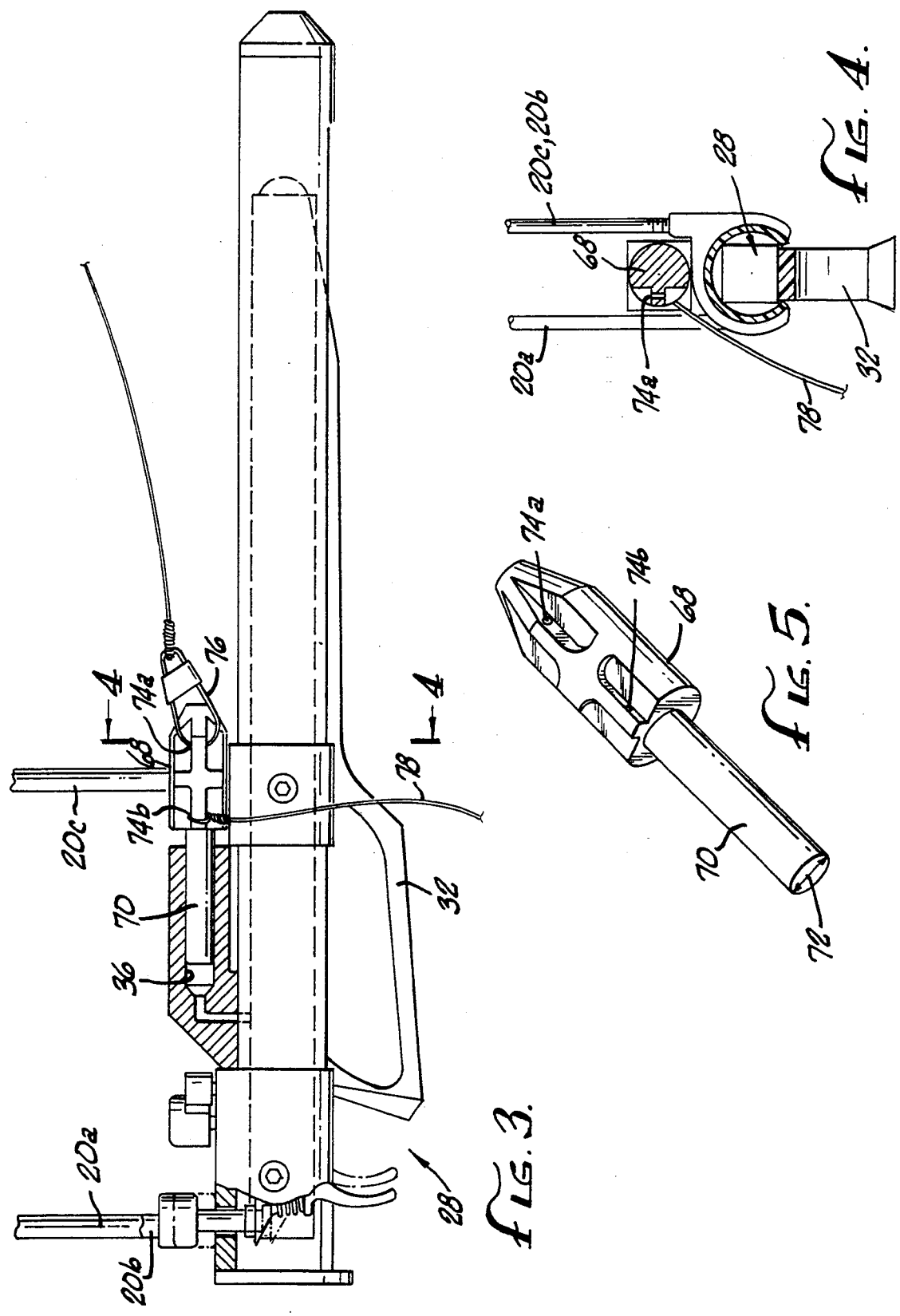

PUMP ACTION CASTER FOR FISHING RODS

This is a continuation-in-part of a parent application, Ser. No. 07/811,011, filed on Dec. 20, 1991, now abandoned.

BACKGROUND OF THE INVENTION

1. Field of the Invention

This invention relates to a gas powered projection device for attachment to a fishing pole for projecting a hook through the air and associated attachment means for securing the projection device to any fishing pole in a manner designed to reduce the possibility that the hook will become entangled in the attachment means.

2. Background of the Invention

The present invention is a new kind of gas powered casting rod and attachment means. While gas powered casting rods are not new in the art, previous such rods have used a $CO_2$ cartridge as the source of pressured gas. See Johnson, U.S. Pat. No. 2,864,197, issued Dec. 16, 1968; Merz, U.S. Pat. No. 2,977,708, issued Apr. 4, 1961; Barnes, U.S. Pat. No. 4,501,085, issued Feb. 26, 1985. Or gas powered harpoon guns have been adapted to be secured to a fishing rod as illustrated in Klein, U.S. Pat. No. 2,090,731, issued Aug. 24, 1937. Such harpoon guns may incorporate manual means for generating air pressure, however they have limited practical value for use with fishing rods for the elderly and handicap because such harpoon guns are heavy, cumbersome structures that extend the entire length of the fishing pole.

The present invention does not use a $CO_2$ cartridge as a propellant or a cumbersome harpoon-type gun found in the prior art. Instead a manual pump action piston is used to build up the appropriate amount of pressure. As will be shown, this approach offers several advantages over the prior art in which $CO_2$ cartridges are employed as a source-of propellant or in which harpoon-type guns were used.

Generally, gas powered casting rods are a valuable tool for persons that may not have the physical ability to cast a fishing line using conventional techniques. This is especially true for handicapped individuals, children, and the elderly. Gas powered rods are also valuable for anyone fishing on crowded piers or boats where there simply is not sufficient space to safely cast a fishing line using conventional techniques. Thus, dangerous accidents and tangled lines with other fisherman can be avoided by using a gas powered fishing rod under such physically restricted circumstances.

Considering the many advantages of gas powered fishing rods, it is unfortunate that they are not more popular. There relative unpopularity is at least partly because of several problems associated with conventional gas powered casting rods that employ $CO_2$ cartridges. One of the most serious problems is that there is no way for the fisherman to adjust the range when casting. The $CO_2$ cartridge propels the lure the maximum possible distance from the fisherman each time the lure is cast. This can be an especially serious problem when the fisherman wants to cast the line at a particular location that appears most promising for catching fish.

Additionally, the fisherman may not want to cast the maximum distance when fishing along a river, stream or pond where casting the maximum distance might tangle the line in reeds or other physical obstructions, or possibly even cast the line onto the opposite bank. While adjusting the angle at which the rod is positioned can effect the distance the lure or bait is projected, this can be a dangerous approach to overcoming the ranging problem because winds might blow the hook in unpredictable directions if the angle of the rod is too steep. To overcome this ranging problem, the present invention provides a manual pump action cylinder by which the fisherman can charge the rod with as much or as little gas pressure as required to project the lure the distance desired.

Moreover, the harpoon-type guns that have been attached to fishing rods in the prior art are not well suited to use by young children, the elderly, or the handicapped for several reasons. First, they are fairly large in that they extend the entire length of the fishing pole. Because of their size, harpoon-type guns attached to fishing rods are difficult to manipulate, which is an especially important factor for those persons with physical limitations that have the greatest need for such an invention. The size also contributes to their weight, which is a negative for the physically restricted persons mentioned above. The bulk of such prior art devices also makes them difficult to transport and store. As a consequence, the only practical alternative for physically restricted persons has been the use of a gas powered rod that employ $CO_2$ cartridges, which has certain disadvantages that have been discussed.

The present invention overcomes these problems by providing a gas powered casting mechanism that is much more compact than that found in the prior art. This reduces the weight and bulk, thus making it much easier to manipulate, transport, and store than the harpoon-type guns found in the prior art.

The present invention is an improvement over the prior art for yet another reason. When a $CO_2$ cartridge begins to run out of gas, the cartridge does not have the power to cast the lure as far. This can be annoying and a serious disadvantage if the loss in pressure begins to occur at a time when one has located a fish that is interested in the lure. By the time the fisherman has replaced the spent $CO_2$ cartridge (assuming the fisherman has not run out of additional cartridges), the fish may be gone. The present invention is more reliable with respect to the consistency of the gas pressure because it eliminates the need for $CO_2$ cartridges altogether and replaces it with a compact, easy to use mechanism that employs human power.

Furthermore, the present invention is more economical, safer, and more environmentally sound than the prior art. The present invention is more economical because it eliminates the need for the fisherman to buy $CO_2$ cartridges. Moreover, for those fisherman who enjoy fishing in remote areas of the United States, replacement $CO_2$ cartridges may not even be available. While the harpoon-type rod has been available to overcome these problems, it has not been favored for the reasons discussed above.

From the stand point of safety, the present invention is better than the prior art because the fisherman is not confronted with the dangers posed by the storage, loading, and unloading of highly pressurized $CO_2$ cartridges. This is an important factor because children and amateurs are more likely to use gas powered casting rods than are professional fisherman and experienced sportsmen. Therefore, the dangers posed by $CO_2$ cartridges are even more real in such inexperienced hands.

The present invention is also safer because of the configuration of the attachment means or rods used to secure the projection mechanism to the fishing pole. By reducing the size of the projection mechanism and positioning it to the rear of the fishing pole to be in reach of the user, the risk is present that the hook will become entangled in the attachment rods possibly causing injury if the projection mechanism is accidentally fired when the user is attempting to untangle the line. This risk has been greatly reduced by providing an attachment rod free zone in which the hook can dangle with reduced risk of entanglement with any attachment means.

Environmentally, the present invention is superior to the prior art because it eliminates the need to divert energy and natural resources to the production of $CO_2$ cartridges and it eliminates the need to dispose of the depleted $CO_2$ cartridges, which obviously do not biodegrade. The present invention also eliminates the danger that $CO_2$ cartridges will be improperly disposed of within environmentally sensitive fishing areas.

SUMMARY OF THE INVENTION

One of the main objects of the present invention is to provide a means for adjusting the distance that a gas powered fishing rod projects a lure by way of a manual pump mechanism so that the user can increase or decrease the range that the lure or bait is projected.

Another object of the present invention is to provide a configuration of attachment means that limits the likelihood that the the hook will become entangles with the attachment means.

Yet another object of the present invention is to provide a compact gas powered projection mechanism that is manual powered that is less cumbersome and heavy than those found in the prior art and is more practical for physically restricted individuals to use.

Another object of the present invention is to provide a gas powered fishing rod that is more reliable than the prior art in that the invention is not dependent on the remaining pressure left in a $CO_2$ cartridge to determine the maximum distance the lure can be projected.

A further object of the invention is to provide a gas powered fishing rod that is environmentally safer than the prior art by replacing disposable $CO_a$ cartridges with human power.

Yet another object of the present invention is to provide a safer gas powered fishing rod by eliminating the inherent dangers posed by the pressurized $CO_2$ cartridges required by the prior art.

Another object of the invention is to provide a gas powered fishing rod that will enable persons to participate in the sport of fishing whom do not have the physical ability to cast a fishing line using conventional techniques.

An additional object of the present invention is to provide a fishing rod that can be used in a physically restricted environment, such as on a crowded fishing boat or pier, that will minimize the amount of space required to cast the fishing line to avoid interference with the activities of other persons on the boat or pier.

These and other objects and advantages of the present invention will become apparent from the following detailed description of the preferred embodiment of the invention without intending to limit the scope of the invention which is set forth in the appended claims.

BRIEF DESCRIPTION OF THE DRAWINGS

The advantages of the invention can be more clearly understood by reference to the drawings in which:

FIG. 1 is a side elevational view of the a conventional rod and reel to which a manual powered gas projection device is secured with the lever of the projection device in the open position;

FIG. 2 is the same view as in FIG. 1 except that the lever of the projection device is in the closed position;

FIG. 3 is a cross-sectional view of the projection device showing an interior view of the firing chamber of the projection device;

FIG. 4 is a front axial view of the projection device taken along along line 4—4;

FIG. 5 is a perspective view of the projectile to which the fishing line is attached.

DETAILED DESCRIPTION OF THE PREFERRED EMBODIMENT

Figure 6:
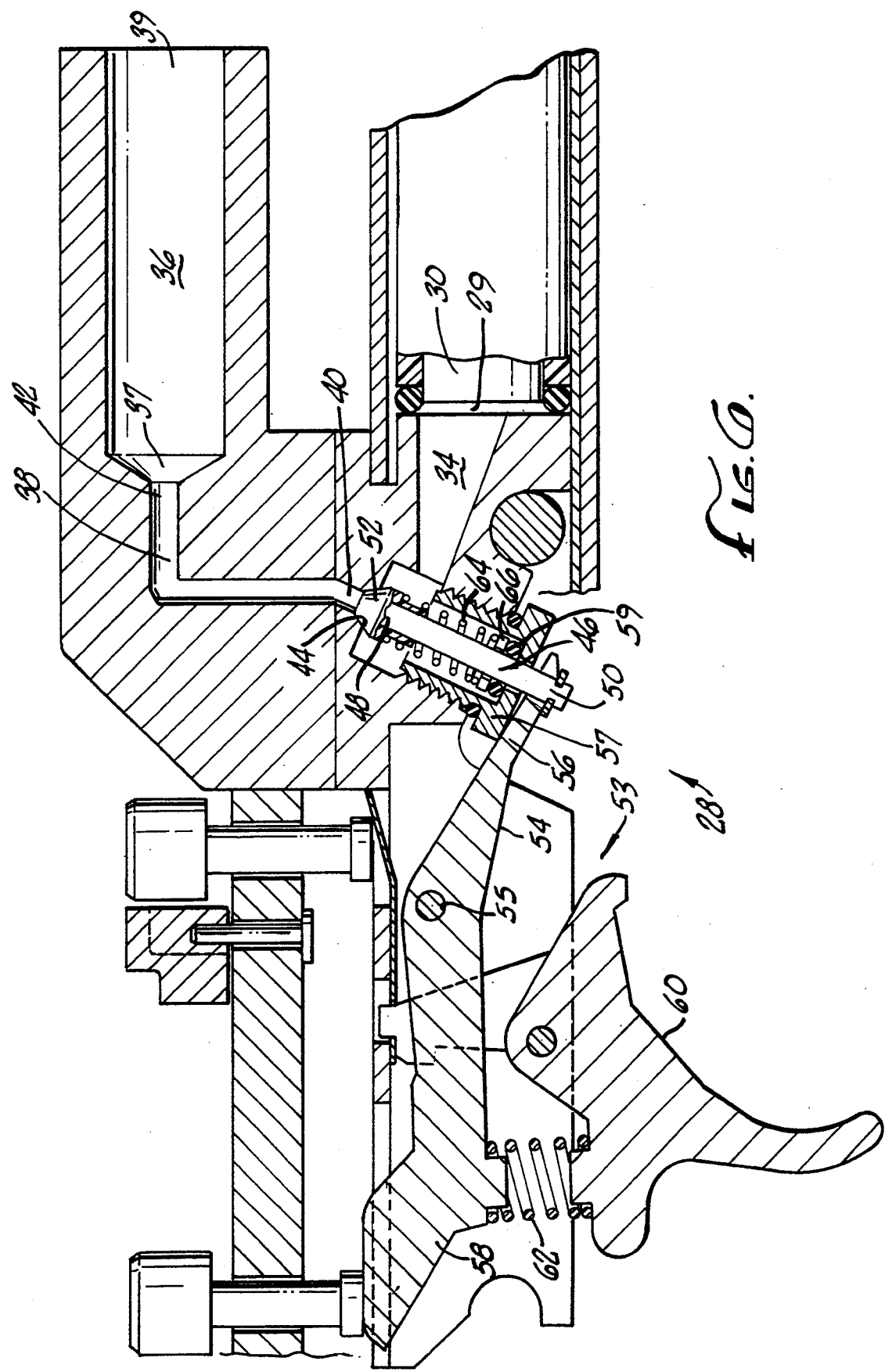
FIG. 6 is an axial cross-sectional view showing the interior of the projection device.

FIG. 1 illustrates the invention, a gas powered fishing rod generally designated 10. The gas powered fishing rod 10 is comprised of a conventional fishing pole 12, a conventional reel 14, a conventional fishing line 16 and a projection device 18. The projection device 18 is attached to the pole 12 by attachment rods 20a, 20b, 20c using clamps 22. In the preferred embodiment, the projection device 18 is no longer than one half the length of the fishing rod 12 as measured from the fishing reel 14 to the end of the rod 12, and pole 12 should be secured together so that axis 24 of the projection device 18 and axis 26 of the pole 12 are generally parallel to each other. Any means of attaching the projection device 18 to the pole 12 will generally work. However, it is preferred that the projection device 18 and the pole 12 be generally parallel to each other.

The projection device 18 has a conventional piston actuated pump mechanism 28 as found in a BB gun. The pump mechanism 28 has a compression chamber 29. Contained within the compression chamber is a conventional piston 30, which is actuated manually using a standard lever 32. The lever 32 is shown in the open position in FIG. 1 and in the closed position in FIG. 2. Each time the lever 32 is opened and closed, the action of the piston 30 causes pressure to build up in a storage space 34 of the chamber 29 just as with a BB gun.

The storage space 34 is connected to a firing chamber 36 by way of passage 38. The firing chamber 36 has an internal end 37 and an external end 39. Passage 38 has a gas receiving end 40 and a gas expulsion end 42. In the preferred embodiment, the expulsion end 42 of passage 38 is connected to the firing chamber 36 at the internal end 37 of the firing chamber 36.

The receiving end 40 of passage 38 has a conical neck 44. A plunger or firing rod 46 fits within the neck 44 thereby preventing pressurized gases in the storage space 34 from entering the firing chamber 36 prematurely. The firing rod 46 has a stopper end 48 and a linkage end 50. In the preferred embodiment, the stopper end 48 of the firing rod 46 has a seal 52 around its circumference to prevent leakage.

The projection device has a trigger mechanism 53 comprised of a trigger arm 54 and a trigger 60. The trigger arm 54 has a front portion 56 and a rear portion 58. The trigger 54 arm can pivot about a pin 55. The front portion 56 of the trigger arm 54 is secured to the bottom end 50 of the firing rod 46. This is possible because the firing rod 46 passes through plate 57. A seal 59 prevents pressure from escaping. The rear portion 58 of the trigger arm 54 is secured to the trigger 60 by means of a trigger spring 62. When the trigger 60 is pulled back, the trigger spring 62 forces the rear portion 58 to move upward, which forces the front portion 56 to move downward.

However, the downward movement of the front portion 56 is resisted by a plunger spring 64. The plunger spring 64 surrounds the firing rod 46 and is biased against a washer 66 and against the seal 52. The spring loaded firing rod 46 snaps back only after sufficient force is applied to the trigger spring 62 to overcome the resistance of the plunger spring 64. This mechanism permits the all of the gas to escape through the passage 38 at once for maximum effect.

The firing chamber 36 is designed to receive a projectile 68. The projectile 68 has a male portion 70 having a diameter 72 only slightly smaller than the diameter of the firing chamber 36 to allow the male portion 70 of the projectile 68 to fit snugly within the firing chamber 36. While in the preferred embodiment, the male portion 70 is cylinderical to fit within the cylinderical firing chamber 36, the male portion 70 can be any shape (e.g. square or octagonal) that matches the shape of the firing chamber 36.

The projectile 68 has one or more apertures 74 through which the fishing line 16 can be secured to the projectile 68. In the embodiment illustrated in FIG. 3, there are two holes 74a, 74b in the projectile 68. A clip 76 is looped through hole 74a and secured to the fishing line 16 that travels to the reel 14. There is a separate portion of fishing line called the hook line 78 having a bait means in the form of a hook or lure 80 attached, which is threaded through separate hole 74b in the projectile 68.

The hook line 78 should be of sufficient length to separate the hook or lure 80 from the projectile 68 in the water so that the fish will not be distracted by the projectile 68 when it approaches the hook or lure 80. But the hook line 78 preferably should not be so long as to run the risk of becoming entangled in the attachment means 20a. In the preferred embodiment, the length of the hook line 78 should be in the range of 4 to 7 inches. No more than one attachment rod 20 should be secured to the projection device 18 at a point within the length of the hook line 78. The hook line 78 can be a separate line as shown in FIG. 1 or it may be an extension of the fishing line 16.

As shown in FIGS. 3 and 4, there are only three attachment means or rods 20 in the preferred embodiment that secure the projection device 18 to the fishing pole 12. There are two attachment rods 20a and 20b positioned rearwardly above the trigger 60, but only one attachment rod 20c is positioned near the firing chamber 36. The absence of an attachment rod on one side of the firing chamber 36 and the fixing of no more than one attachment rod 20 at a point within the length of the hook line 78 are important features because they prevent the hook 80 from becoming entangled with an attachment rod 20 when the projectile 68 is fired. Regardless of the number of the attachment rods 20, it is important to keep the rods 20 clear of the firing chamber 36 at least on one side to prevent the hook 80 from becoming snagged during firing or at any other time. While attachment rods 20 are illustrated, any attachment means for securing the projection mechanism 18 to the fishing pole 12 will work.

The invention and its attendant advantages will be understood from the foregoing description and it will be apparent that various changes may be made without departing from invention's spirit.

I claim:

1. A gas powered fishing pole that includes a fishing pole, fishing line, and a projection mechanism attached to said fishing pole for firing a projectile with said fishing line attached thereto wherein the projection mechanism comprises:

a single pump mechanism having an elongated compression chamber, said chamber having a piston contained therein, said piston connected to and actuated by a lever external to said chamber;

an elongated firing chamber having an internal end and an external end, said firing chamber substantially parallel to said fishing pole and substantially parallel to said compression chamber, said projectile having a male portion, said male portion fitting within said firing chamber at said external end;

a passage having a gas receiving end and a gas expulsion end, said gas receiving end connected to said compression chamber, said gas expulsion end connected to said internal end of said firing chamber;

a plunger capable of blocking said gas receiving end of said passage;

a trigger mechanism secured to said plunger to withdraw said plunger from said receiving end of said passage when said trigger mechanism is activated; and, a plurality of attachment rods securing said projection mechanism to said fishing pole wherein no more than one of said attachment rods is secured to said projection mechanism at a point in proximity to said external end of said firing chamber.

2. A gas powered fishing pole comprising:

a fishing pole;

a projection mechanism secured to said fishing pole by a plurality of attachment rods wherein no more than one of said attachment rods is secured to said projection mechanism at a point in proximity to said external end of said firing chamber;

said projection mechanism including a single pump mechanism having an elongated compression chamber, said chamber having a piston contained therein, said piston connected to and actuated by a lever external to said chamber, an elongated firing chamber having an internal end and an external end, said firing chamber substantially parallel to said fishing pole and to said compression chamber, said external end open for receiving a projectile, a passage having a gas receiving end and a gas expulsion end, said gas receiving end connected to said compression chamber, said gas expulsion end connected to said internal end of said firing chamber, a plunger having a stopper end and a linkage end, said stopper end capable of blocking said gas receiving end of said passage, and a trigger mechanism secured to said linkage end of said plunger to withdraw said plunger from said receiving end of said passage when said trigger mechanism is activated whereby said firing chamber ejects said projectile.

3. A gas powered fishing pole that includes a fishing pole, fishing line, fishing reel and a projection device attached to said fishing pole for firing a projectile with said fishing line attached thereto, said fishing pole having a terminal end from which said fishing line extends, a portion of said fishing line wound within said reel, said line extending from said reel to said terminal end of said fishing pole, said line extending from said terminal end to said projectile and secured thereto wherein said improvement comprises:
- a single pump mechanism having an elongated compression chamber, said chamber having a piston contained therein, said piston connected to and actuated by a lever external to said chamber;
- an elongated firing chamber having an internal end and an external end, said firing chamber substantially parallel to said fishing pole and substantially parallel to said compression chamber, said projectile having a male portion, said male portion fitting within said firing chamber at said external end;
- a hook line secured to said projectile and secured to a bait means, said hook line having a length;
- a passage having a gas receiving end and a gas expulsion end, said gas receiving end connected to said compression chamber, said gas expulsion end connected to said internal end of said firing chamber;
- a firing rod capable of blocking said gas receiving end of said passage;
- a trigger mechanism secured to said firing rod to withdraw said rod from said receiving end of said passage when said trigger mechanism is activated; and,
- a plurality of attachment rods securing said projection device to said fishing pole wherein no more than one of said attachment rods is secured to said projection device at a point within said length of said hook line, said projection device being no longer than one half the length of said fishing pole as measured from said reel to said end of said pole.

4. A gas powered fishing pole as in claim 3 wherein said hook line is within the range of 4 to 7 inches.

5. A gas powered fishing pole comprising:
- a fishing pole, fishing line, and fishing reel, said fishing pole having a terminal end from which said fishing line extends;
- a projection device secured to said fishing pole by a plurality of attachment rods wherein no more than one of said attachment rods is secured to said projection device at a point in proximity to said external end of said firing chamber, said projection device being no longer than one half the length of said fishing pole as measured from said reel to said end of said pole;
- said projection device including a single pump mechanism having an elongated compression chamber, said chamber having a piston contained therein, said piston connected to and actuated by a lever external to said chamber, an elongated firing chamber having an internal end and an external end, said firing chamber substantially parallel to said fishing pole and to said compression chamber, said external end open for receiving a projectile, a passage having a gas receiving end and a gas expulsion end, said gas receiving end connected to said compression chamber, said gas expulsion end connected to said internal end of said firing chamber, a firing rod having a stopper end and a linkage end, said stopper end capable of blocking said gas receiving end of said passage, and a trigger mechanism secured to said linkage end of said firing rod to withdraw said rod from said receiving end of said passage when said trigger mechanism is activated whereby said firing chamber ejects said projectile.

6. A gas powered fishing pole as in claim 5 wherein said fishing line wound within said reel, said line extending from said reel to said terminal end of said fishing pole, said line extending from said terminal end to said projectile and secured thereto;
- a hook line secured to said projectile and secured to a bait means, said hook line having a length, and no more than one of said attachment rods is secured to said projection device at a point within said length of said hook line.

7. A gas powered fishing pole as in claim 6 wherein said hook line is within the range of 4 to 7 inches.

* * * * *